(12) United States Patent
Kang

(10) Patent No.: US 9,616,813 B2
(45) Date of Patent: Apr. 11, 2017

(54) SOUND GENERATING DEVICE FOR VEHICLE

(71) Applicant: YEIL ELECTRONICS CO., LTD., Incheon (KR)

(72) Inventor: Yoon Kyu Kang, Gyeonggi-do (KR)

(73) Assignee: YEIL ELECTRONICS CO., LTD., Incheon (KR)

( * ) Notice: Subject to any disclaimer, the term of this patent is extended or adjusted under 35 U.S.C. 154(b) by 0 days.

(21) Appl. No.: 14/778,541

(22) PCT Filed: Apr. 14, 2013

(86) PCT No.: PCT/KR2013/004261
§ 371 (c)(1),
(2) Date: Sep. 18, 2015

(87) PCT Pub. No.: WO2014/148678
PCT Pub. Date: Sep. 25, 2014

(65) Prior Publication Data
US 2016/0107568 A1    Apr. 21, 2016

(30) Foreign Application Priority Data

Mar. 18, 2013   (KR) .................. 10-2013-0028801

(51) Int. Cl.
*B60Q 5/00*    (2006.01)
*B60R 11/00*   (2006.01)
(Continued)

(52) U.S. Cl.
CPC .......... *B60Q 5/008* (2013.01); *B60R 11/0217* (2013.01); *H04R 9/025* (2013.01);
(Continued)

(58) Field of Classification Search
CPC ............... B60G 5/008; B60R 11/0217; B60R 2011/004; H04R 1/026; H04R 7/045; H04R 2440/05; H04R 2499/13; H04R 9/025

See application file for complete search history.

(56) References Cited

U.S. PATENT DOCUMENTS 4,514,599 A  *  4/1985  Yanagishima ........... H04R 1/24
                                                        381/152
2009/0025995 A1*  1/2009  Wang ................... B62D 25/105
                                                        180/69.2

(Continued)

FOREIGN PATENT DOCUMENTS

JP          06-321019       11/1994
JP        2005-318195       11/2005
(Continued)

OTHER PUBLICATIONS

HiWave Technologies, HiWave Exciter Integration Guide, Nov. 2012, p. 1 and 2.*

*Primary Examiner* — Sonia Gay
(74) *Attorney, Agent, or Firm* — IP&T Group LLP

(57) ABSTRACT

Disclosed is a sound generating device for vehicle, more particularly, in case of fastening a sound generating device for outputting artificial engine sound (for example, start-up, or accelerating etc.) onto the automobile vehicle's surface, for example the bonnet, the sound generating device's sound transfer face is pressed to the bonnet, and the sound or vibration of the sound generator is dispersed and output outwardly through the bonnet without attenuation.

11 Claims, 12 Drawing Sheets

(51) Int. Cl.
*B60R 11/02* (2006.01)
*H04R 9/02* (2006.01)
*H04R 1/02* (2006.01)
*H04R 7/04* (2006.01)

(52) U.S. Cl.
CPC ......... *B60R 2011/004* (2013.01); *H04R 1/026* (2013.01); *H04R 7/045* (2013.01); *H04R 2440/05* (2013.01); *H04R 2499/13* (2013.01)

(56) References Cited

U.S. PATENT DOCUMENTS

| | | | | |
|---|---|---|---|---|
| 2012/0126969 | A1* | 5/2012 | Wilbur | B60Q 5/008 340/466 |
| 2012/0285759 | A1* | 11/2012 | Ikeda | B60R 21/34 180/69.2 |
| 2013/0208912 | A1* | 8/2013 | Wiederwohl | B60L 3/0015 381/86 |
| 2014/0121864 | A1* | 5/2014 | Nakatani | B60Q 5/008 701/22 |

FOREIGN PATENT DOCUMENTS

| | | |
|---|---|---|
| JP | 2011-084258 | 4/2011 |
| JP | 2013-005340 | 1/2013 |

\* cited by examiner

SOUND GENERATING DEVICE FOR VEHICLE

This application is a national stage application of PCT/KR2013/004261 filed on May 14, 2013, which claims priority of Korean patent application number 10-2013-0028801 filed on Mar. 18, 2013. The disclosure of each of the foregoing applications is incorporated herein by reference in its entirety.

TECHNICAL FIELD

The present invention relates to a sound generating device for vehicle, more particularly, in case of fastening a sound generating device for outputting artificial engine sound (for example, start-up, or accelerating etc.) onto the automobile vehicle's surface, for example the bonnet, the sound generating device's sound transfer face is pressed to the bonnet, and the sound or vibration of the sound generator is dispersed and output outwardly through the bonnet without attenuation.

BACKGROUND ART

Generally, a vehicle is a machine that runs on roads by wheels powered by motor equipped on the vehicle, as to transfer persons or goods and to do various works, for example, including machines powered by motor such as internal combustion engine including gasoline engine and diesel engine, steam engine, electric motor (electric vehicle), gas turbine, or the like As continuously developing with ever so new technology since introduced, in the noise related art field, the vehicle can be so silent that no sound could be heard by persons. Especially, the electric vehicle hardly generates any sound so that a person could hear no noise from the vehicle with his ears.

Here, the electric vehicle uses a direct current motor as its power and a storage battery as its electric source. The electric vehicle has many advantages such as no exhaust gas, or less noise. It has, however, shortcomings such as too large and too heavy battery, and too short running time.

However as the technology developing, recently a compact and light-weight battery developed, as a result the electric vehicle commercialized, even a hybrid car that uses both gasoline engine and electric motor introduced.

But, in cases of electric vehicles and hybrid vehicles, practically the noise of them is too low to be heard by pedestrians. This can cause sometimes car accidents between vehicles and pedestrians since a person walking could not hear or recognize that a car approaching to him.

National Highway Traffic Safety Administration (NHTSA) under DOT (Department of Transportation) in U.S.A had suggested Pedestrian Safety Enhancement Act of 2010 (PSEA) which includes least noise standard for hybrid or electric vehicles.

The standard applies hybrid or electric vehicles with least noise standards, because, not like internal combustion engines for which decreased noise is aimed, hybrid or electric vehicles generates so little noises rather that could cause accidents due to a person not hearing an near-approached car.

If proper noises are generated as a quiet car is moving, pedestrians could easily recognize that the car is approaching to him, and could avoid accidents such as minor collisions or fender-benders.

Safety should be preferred in traffic policies, the standard aims to much higher safety for vehicle drivers, bicycle drivers, pedestrians, or the like on roads in cities or expressways.

Usually, hybrid or electric vehicles, in lower speeds, did not operate gasoline or diesel engines resulting very quiet moving, and a person could not easily hear the approaching vehicles.

Therefore, hybrid or electric vehicles is required the least noise standard, when they is running at lower speeds such as below 18.6 miles/hour (30 km/h). This requirement considers that among various roads noises, traffic noises, and environmental background noises, the approaching vehicles should be heard by pedestrians.

Therefore, vehicle maker companies have needs to generate various noises according to the various vehicle models, in which noise select ranges are important. Properties of selected noises, however, should be corresponded to the noise requirements or standards, in addition that vehicles of same model should generate same group of noises or same noise.

To generate noises, as shown in FIG. 1, a speaker 5 equipped outside of a vehicle 1, in particular at area of a bonnet 2, may generate sound similar to engine noises of a vehicle.

The bonnet 2 on which the speaker S is installed, may have a double structure including inner space, as shown in FIG. 2, or a double structure including a support frame 2" welded and joined to the body of the bonnet 2' to form embossed structures, as shown in FIG. 3.

In case of the bonnet 2 of a double structure including inner space as shown in FIG. 2, a hole is formed on the inner bonnet at engine room side, and then the speaker S is screw tightened against timer face of the outer bonnet through the hole of the inner bonnet.

However, this structure, in which the speaker for vehicle is installed, has a critical problem that the screw fastening the speaker S onto the bonnet 2 is exposed to outside the bonnet 2, and decreases esthetic feelings for exterior of the vehicle.

In case of the bonnet 2 of a double structure including a support frame 2" welded and joined to the body of the bonnet 2' to form embossed structures, as shown in FIG. 3, the speaker S is not fastened directly onto the bonnet 2, rather the speaker S is fastened to a fastening member 3 which joined to the embossed structures of the support frame 2".

Although this could solve the problem, that the exposed screw decreases esthetic feelings for exterior of the vehicle, still there is other problems that the sound or vibration from the speaker S should first transfer to the fastening member 3 before the bonnet 2. This problem may cause attenuation of the output of the sound or vibration being transferred.

DETAILED DESCRIPTION OF THE INVENTION

Technical Problem

The present invention has been made in an effort to solve the above-described problems and to satisfy technical needs, and it is an object of the present invention to provide a sound generating device for vehicle, more particularly, in case of fastening a sound generating device for outputting artificial engine sound (for example, start-up, or accelerating etc.) onto the automobile vehicle's surface, for example the bonnet, the sound generating device's sound transfer face is pressed to the bonnet, and the sound or vibration of the sound generator is dispersed and output outwardly through the bonnet without attenuation.

Technical Solution

To achieve above mentioned technical objects, in accordance with an aspect of the present invention, there is provided a sound generating device for vehicle, the sound generating device comprising: a sound generator 20 vibrating to output sound signal corresponding to a sound source, which has a coil applied electric alternating signals that interacts with a magnetic circuit including a magnet; a dispenser 30 in the vehicle, which comprises a double layered plate formed by a first disperser member 31 and a second disperser member 32, or comprises a one layered plate formed by a first disperser member 31 and a support frame 33; and a generator housing 10 to hold the sound generator 20 between the first disperser member 31 and the second disperser member 32 or the support frame 33, and to transfers three-dimensionally the sound generated by the generator 20 to the disperser 30.

Advantageous Effects

According to the present invention, the effect can be obtained that the sound generating device can be equipped without deforming the disperser 30, i.e. the bonnet, since the sound transfer face 11a of the case is pressed and fastened to the disperser 30.

And, according to the present invention, the sound transfer face 11a of the sound generating device is pressed and fastened to the first disperser member 31 among the disperser 30, while the fastener 12 of the sound generating device is pressed and fastened to the second disperser member 32 among the disperser 30. As a result, the output of the sound generating device transfers and disperses both directions of the disperser 30 and disperses.

This can improve sound transfer ratio from the sound generating device to the bonnet, i.e. the disperser 30, without attenuation of output from the sound generating device.

MODE FOR CARRYING OUT THE INVENTION

Figure 1:
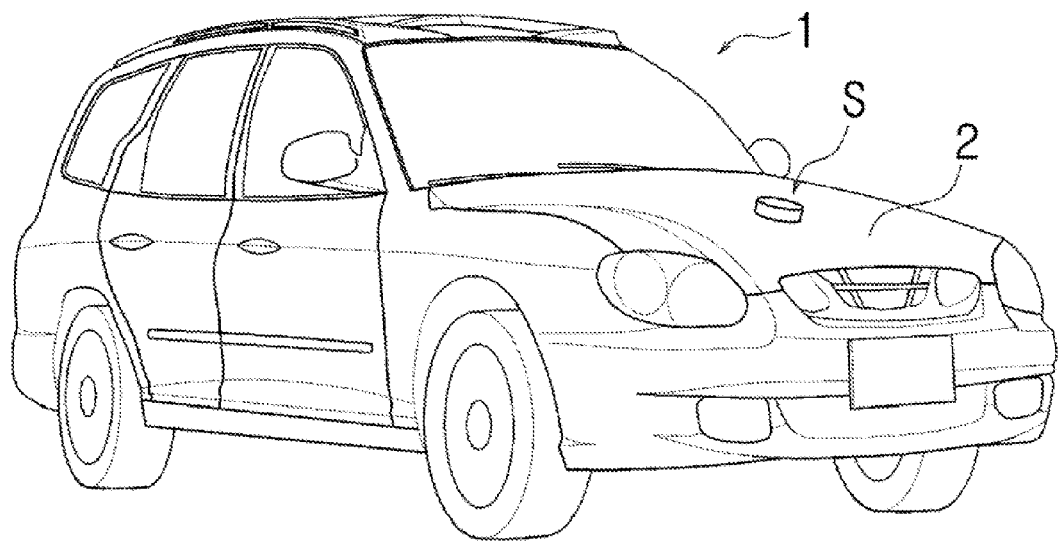
FIG. 1 is a perspective view showing an example of an outside speaker for vehicle equipped.
Figure 2:
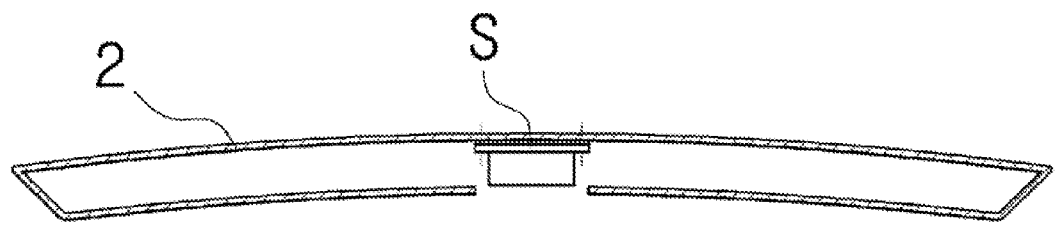
FIG. 2 is a sectional view showing an example of an outside speaker for vehicle conventionally equipped at a double layered bonnet having inner space.
Figure 3:
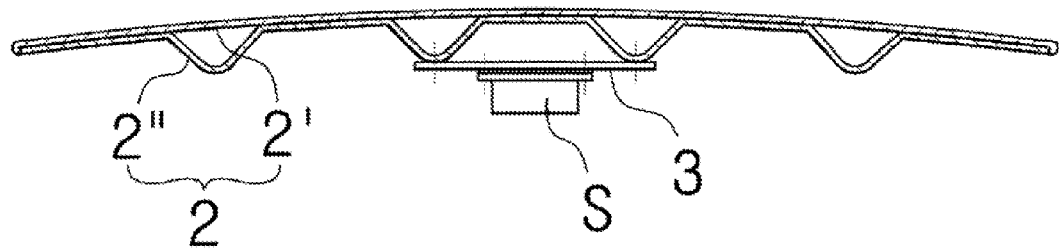
FIG. 3 is a sectional view showing an example of an outside speaker for vehicle conventionally equipped at an embossed double layered bonnet.
Figure 4:
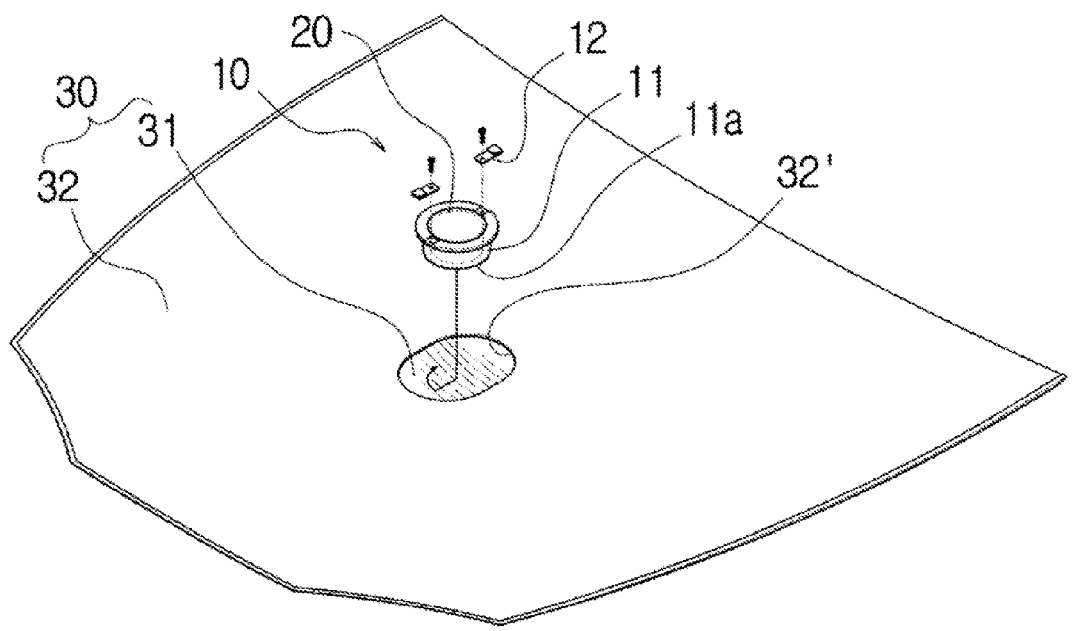
FIG. 4 is a perspective view showing a composition of an embodiment according to the present invention.
Figure 5:
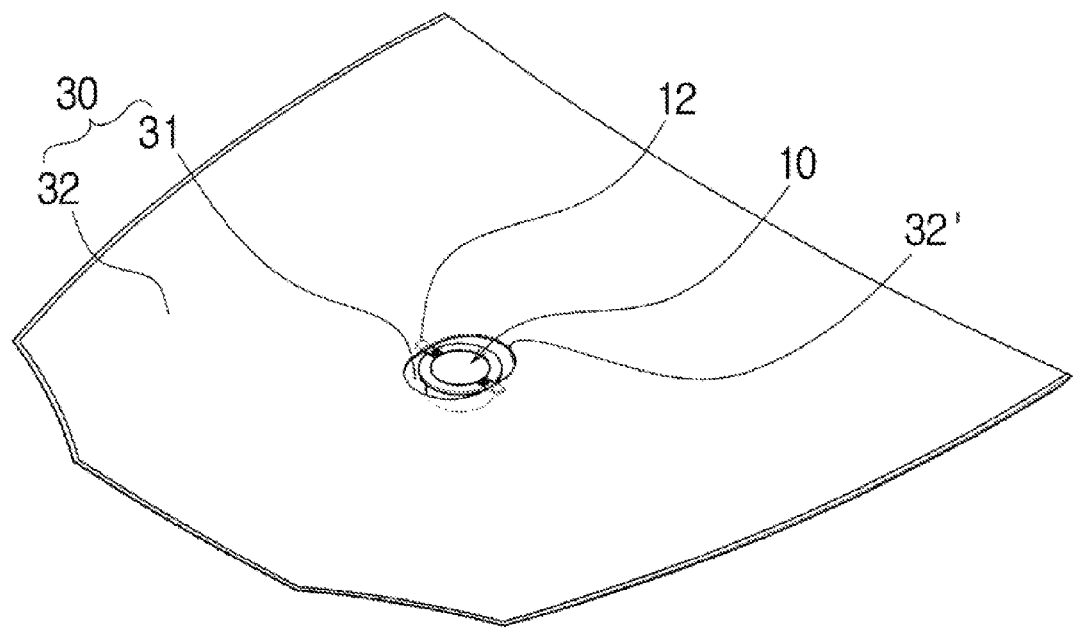
FIG. 5 is a perspective view showing a composition of an embodiment according to the present invention.
Figure 6:
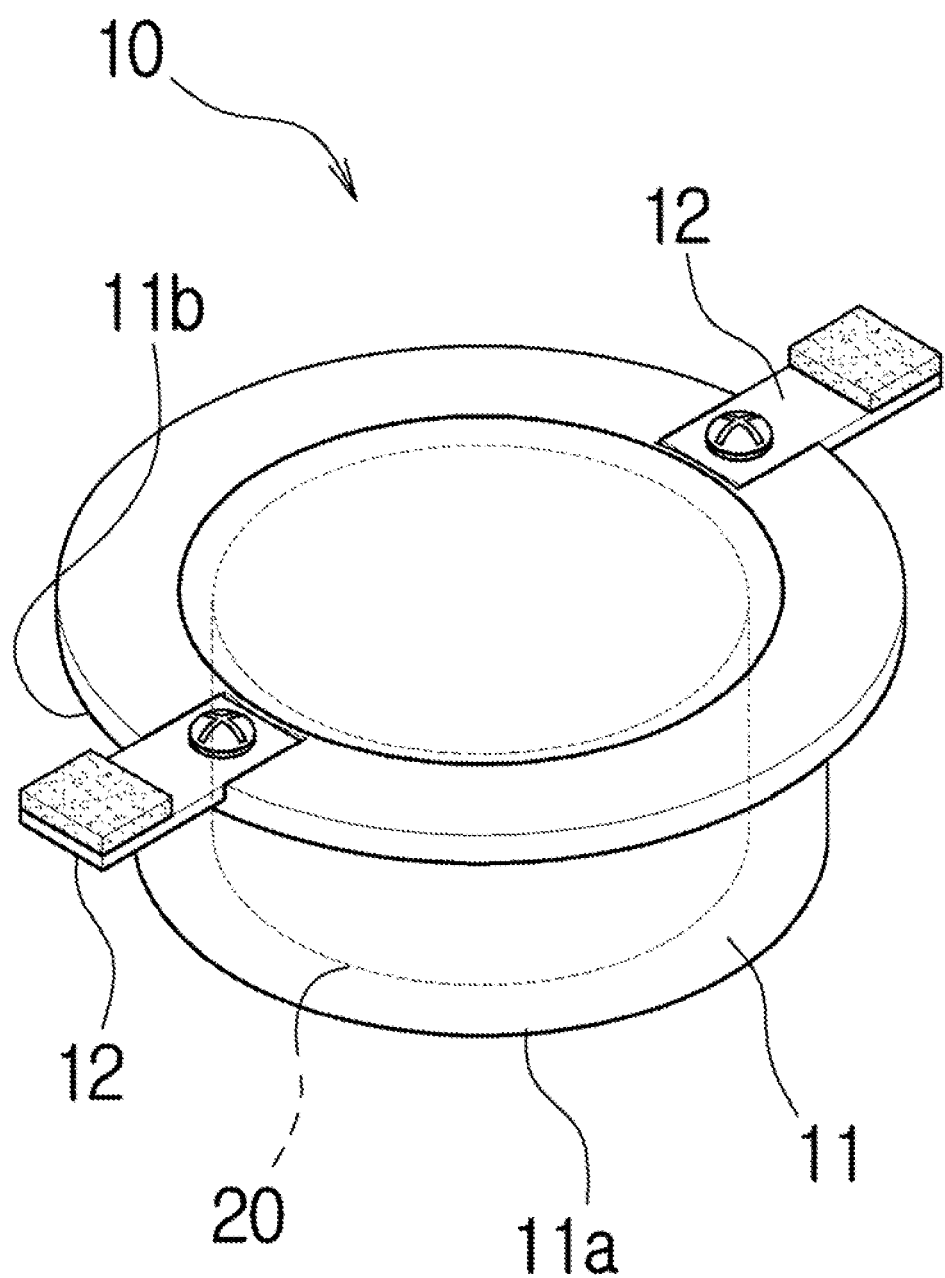
FIG. 6 is a bottom perspective view showing a composition of an embodiment according to the present invention.
Figure 7:
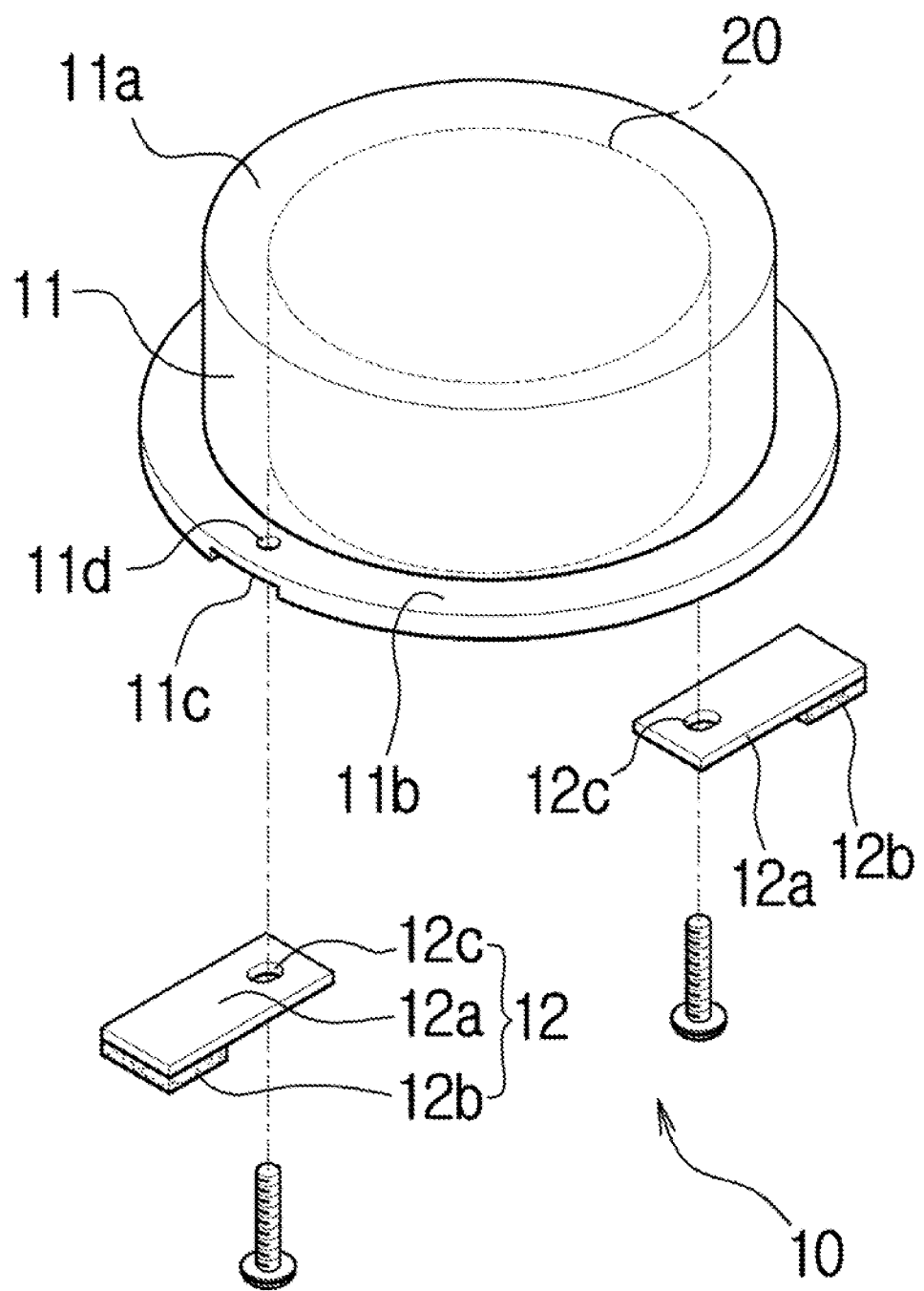
FIG. 7 is an exploded perspective view showing a composition of an embodiment according to the present invention.

Hereinafter, the present invention will be described with reference to the accompanying drawings.

First, as shown in FIGS. 4 to 7, the present invention may comprise a sound generator 20 vibrating to output sound signal corresponding to a sound source, which has a coil applied electric alternating signals that interacts with a magnetic circuit including a magnet; a disperser 30 in the vehicle, which comprises a double layered plate formed by a first disperser member: 31 and a second disperser member 32, or comprises a one layered plate formed by a first disperser member 31 and a support frame 33; and a generator housing 10 to hold the sound generator 20 between the first disperser member 31 and the second disperser member 32 or the support frame 33, and to transfers three-dimensionally the sound generated by the generator 20 to the disperser 30.

Wherein, the generator housing 10 may comprise: a case 11 to hold the sound generator 20, and to provide a sound transfer face 11a against the first disperser member 31; and a fastener or fasteners 12 protruded from a side of two sides of the case 11, which provides pressure onto the second disperser member 32 or the support frame 33 by screw tightening so that the sound transfer face 11a can be pressed to the first disperser member 31.

The case 11 may comprise a flange 11b at one outer circumference having diameter larger than that of the case 11.

In this case 11, one end of the fastener 12 may foe put into the outer face of the flange 11b so as to have some height with and not protruded out from the outer face of the flange 11b, and the case 11 may have fastening grooves 11c to prevent the fastener 12 moving laterally.

The fastening grooves 11c may comprise 2 fastening grooves opposing each other, or 3 fastening grooves spaced apart by a same interval, wherein positions and numbers of the fastening grooves may vary according shapes or conditions of the disperser 30.

And in the fastening grooves 11c, screw holes 11d may be formed to screw tighten the fastener 12.

Figure 8:
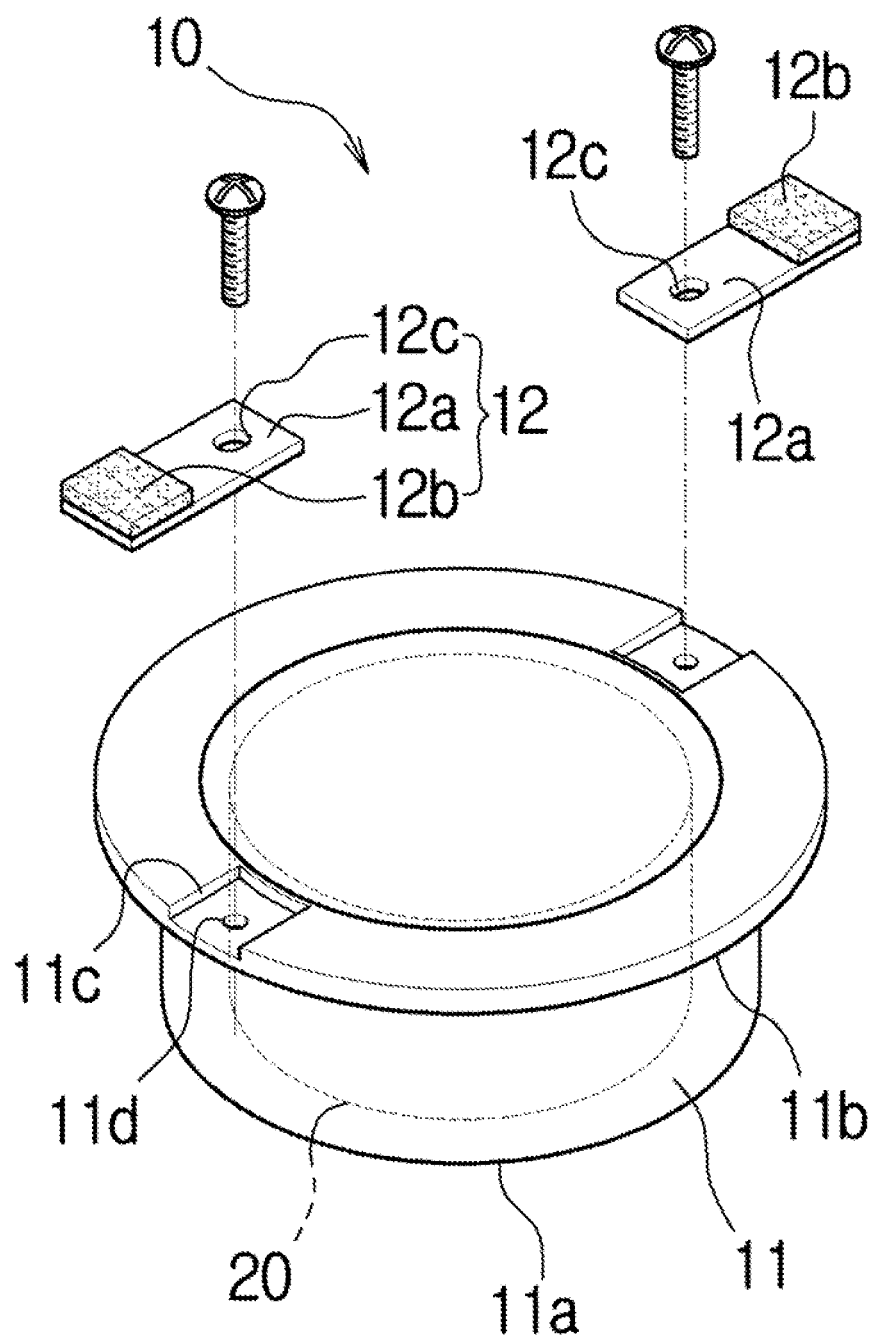
FIG. 8 is an exploded bottom perspective view showing a composition of an embodiment according to the present invention.

Also, as shown in FIG. 8, the case 11 may comprise flanges 11b at both outer circumferences of the case 11.

Wherein the flange 11b at one outer circumference may provide a fastening area for the fastener 12, the flange 11b expanded at the other outer circumference may provide expansion of the sound transfer face.

Figure 9:
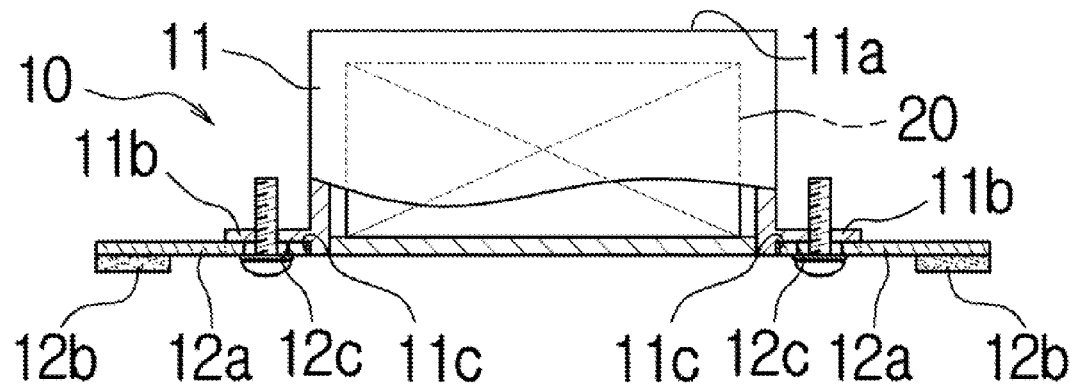
FIG. 9 is a sectional view showing a composition of an embodiment according to the present invention.
Figure 10:
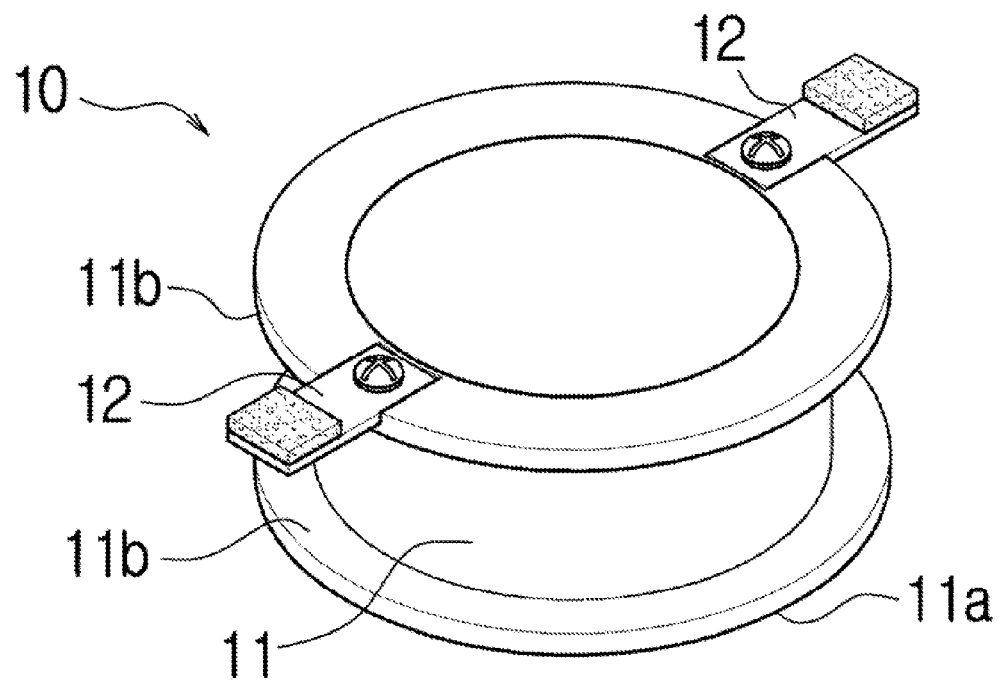
FIG. 10 is a perspective view showing a composition of another embodiment according to the present invention.

And, as shown in FIG. 9, the fastening groove 11c, that is an insert fastening area of the fastener 12, may be formed at one side of the case 11, not at the flange.

Meanwhile, according to the present invention, the fastener 12 may be a fastener comprised fastening pieces 12a; volume piece 12b provided at one end of the fastening pieces 12a corresponding the second disperser member 32, which provides pressing or sticking force against the second disperser member 32; and hole 12c formed at the other end of the fastening pieces 12a so that a screw can be combined into a screw hole 11d formed at a face of the case 11.

Wherein the fastening piece 12a may be at least one of a rectangular plate having a long axis and a short axis, a rectangular plate folded into a shape like "⌐⌐", and a rectangular plate folded into a shape like "⌐".

And, the volume piece 12b may be an elastic member comprised, for example, rubber.

And, the hole 12c may be a circular hole completely penetrated, or a long hole (which can be varied its width).

And, number of the fastener 12 may be corresponding to the number of fastening groove 11c of the case 11.

Also meanwhile, according to an embodiment of the present invention, the sound generator 20, which vibrates to output sound signal corresponding to a sound source, which has a coil applied electric alternating signals that interacts with a magnetic circuit including a magnet, may comprise a support frame (for example, plate spring or magnetic fluid) to support the magnetic circuit in the case 11.

In this case, the interactions between the coil and the magnetic circuit may be an action to transform electric energy to mechanical energy by means of coil and magnet (core) based on Fleming's Left Hand Rule, which describes that a conductor with electric current is applied force in magnetic field.

Above mentioned mechanical energy corresponds to vibrations, oscillation, or back and forth linear movements. The sound generator's vibration may be vibrations of a vibrating plate fastened at an end of the coil; vibrations of the magnetic circuit; or simultaneous vibrations of both of the vibrating plate and the magnetic circuit.

And, the vibration's direction may foe in a direction moving back and forth linearly in a direction of the coil, or moving back and forth linearly in a lateral direction with the center at the coil.

Also, the mechanical energy may be corresponds to rotational movements.

Also meanwhile, according to an embodiment of the invention, the disperser 30 may be a vehicle (automobile car) bonnet, trunk door or truck lid, front or rear fender of vehicle, or any plate-shaped component of vehicle.

The disperser 30 may comprise a double layered structure having inner space formed by a first disperser member 31 and a second disperser member 32, or a double layered structure formed by a plate of first disperser member 31 and a support frame 33 welded to and protruded(or embossed) on the plate of first disperser member 31.

When the disperser 30 is a bonnet, the second disperser member 32 may be positioned at engine room side of the bonnet, and may comprise a fit-in hole 32' which is a circle hole having a diameter larger than that of the case 11, or a long hole having a long axis and a short axis.

Now, hereinafter the operations of an embodiment of the present invention having above mentioned compositions will be described.

First, an embodiment of the present invention comprises a sound generator 20 vibrating to output sound signal corresponding to a sound source, which has a coil applied electric alternating signals that interacts with a magnetic circuit including a magnet; a disperser 30 in the vehicle, which comprises a double layered plate formed by a first disperser member 31 and a second disperser member 32, or comprises a one layered plate formed by a first disperser member 31 and a support frame 33; and a generator housing 10 to hold the sound generator 20, wherein the generator housing 10 comprise: a case 11 to hold the sound generator 20, and to provide a sound transfer face 11a against the first disperser member 31; and a fastener or fasteners 12 protruded from a side of two sides of the case 11, which provides pressure onto the second disperser member 32 or the support frame 33 by screw tightening so that the sound transfer face 11a can be pressed to the first disperser member 31.

According to the embodiment, the case 11 for holding and accepting the sound generator 20, comprises a flange 11b at one outer circumference. Wherein one end of the fastener 12 is put into the outer face of the flange 11b so as to have some height with and not protruded out from the outer face of the flange 11b. The case 11 may have fastening grooves 11c to prevent the fastener 12 moving laterally.

The fastening grooves 11c comprises 2 fastening grooves opposing each other, or 3 fastening grooves spaced apart by a same interval, in which screw holes 11d are formed to screw tighten the fastener 12.

Meanwhile, according to the present invention, the fastener 12 is a fastener comprised by fastening pieces 12a; volume piece 12b provided at one end of the fastening pieces 12a corresponding the second disperser member 32. Wherein the fastening piece 12a is at least one of a rectangular plate having a long axis and a short axis, a rectangular plate folded into a shape like "⌐⌐", and a rectangular plate folded into a shape like "⌐".

In case of the fastening piece 12a is a rectangular plate folded into a shape like "⌐⌐", and a rectangular plate folded into a shape like "⌐", and when the disperser 30 comprised by the first disperser member 31 and the second disperser member 32, the present invention may be applied in case that the depth of the inner space of the disperser 30 is larger than the height of the generator housing 10.

In present embodiment the disperser 30 is a vehicle bonnet.

In this case, the disperser 30 may be a double layered structure having inner space formed by a first disperser member 31 and a second disperser member 32, or a double layered structure formed by a plate of first disperser member 31 and a support frame 33 welded to and embossed on the plate of first disperser member 31.

At the second disperser member 32 positioned at engine room side of the bonnet, comprises a fit-in hole 32' which is a circle hole having a diameter larger than that of the case 11, or a long hole having a long axis and a short axis.

When the disperser 30 is a double layered structure formed by a plate of first disperser member 31 and a support frame 33 welded to and embossed on the plate of first disperser member 31, an auxiliary fastener 34 is provided onto at least two protruded points among embosses of the support frame 33. The auxiliary fastener 34 has a fit-in hole 34'.

Figure 12:
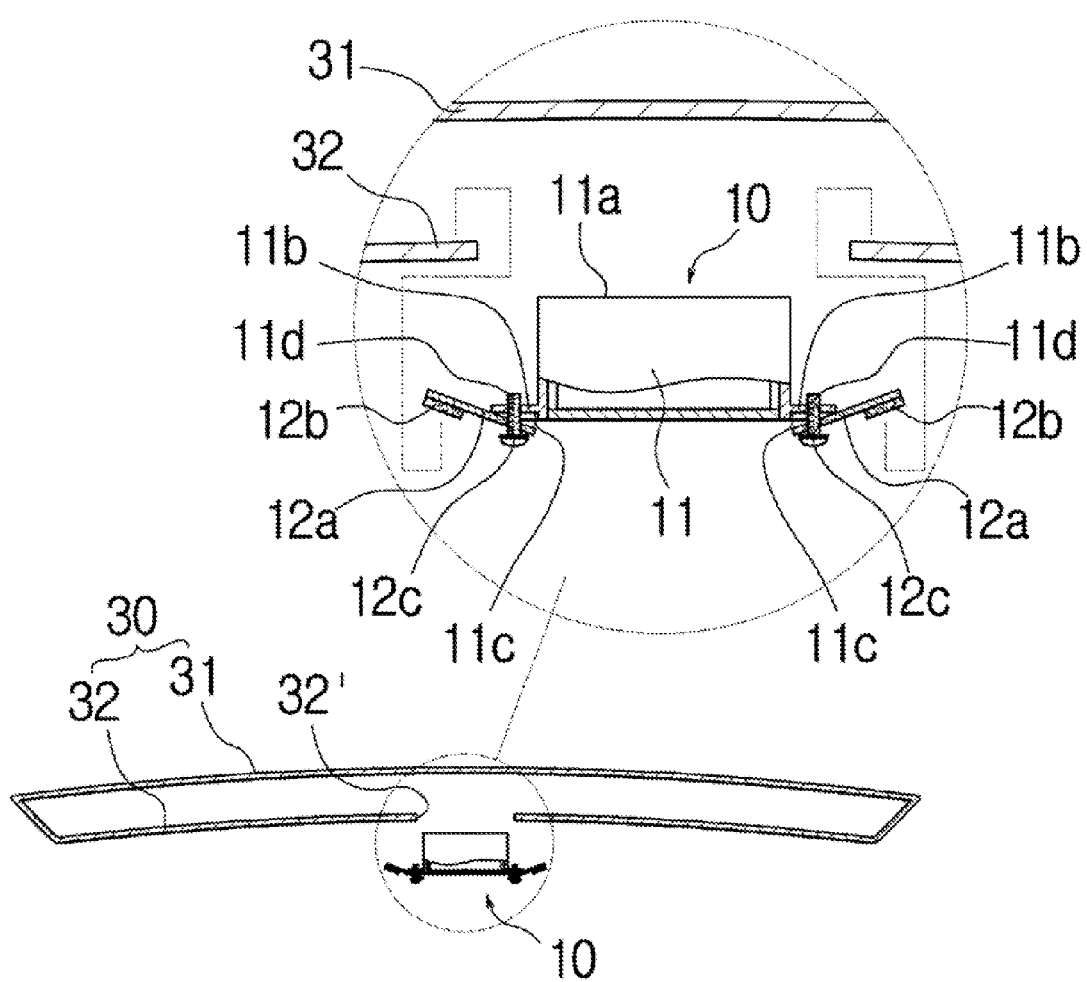
FIG. 12 is a perspective view showing an equipped state of an embodiment according to the present invention.

According the present invention, as shown in FIG. 12, the present device may be equipped from the fit-in hole 32' formed at inner face of the bonnet in direction of the engine room on the second disperser member 32 of the disperser 30 of the vehicle.

For example, the case 11 may be inserted into the fit-in hole 32' of the second disperser member 32 due to the diameter of the case 11 is slightly smaller than the diameter of the fit-in hole 32'. Considering the interference the fastener 12 protruded from the both sides of the case 11 and the fit-in hole 32', the case 11 may be inserted such that the fastener 12 is aligned to the direction of the long axis of the fit-in hole 32 (that is, in case the fit-in hole 32 is a long hole), In inserting the case 11, the sound transfer face 11a of the case 11 may be facing the inner face to the outer layer (that is, the first disperser member 31), while the volume piece 12b of the fastener 12 may be facing to an inner face (that is, the opposite face to the inner face of the outer layer of the bonnet) of the inner layer (that is, the second disperser member 32) positioned at the direction of the engine room, of the bonnet.

Figure 11:
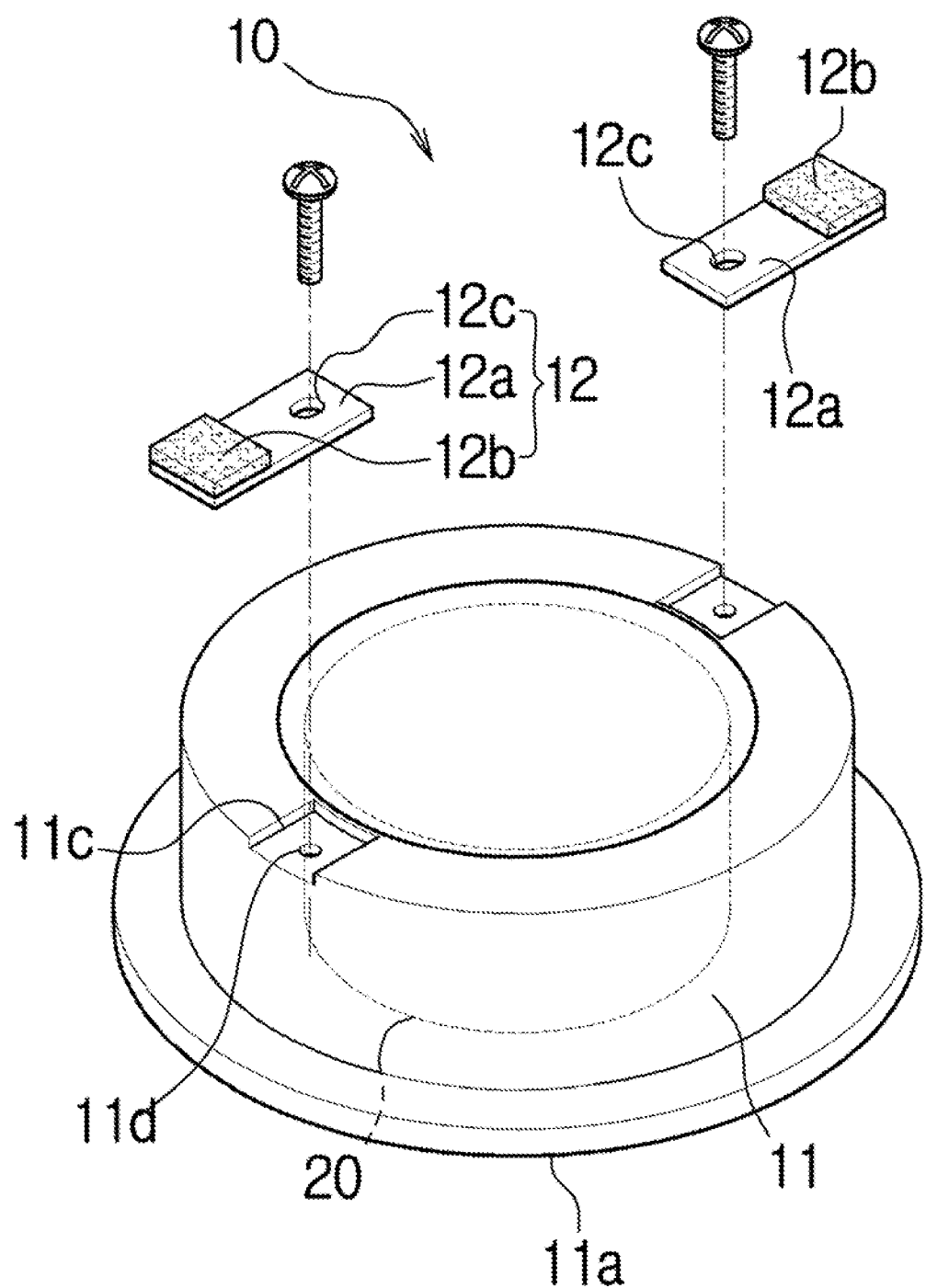
FIG. 11 is an exploded perspective view showing a composition of an embodiment according to the present invention.

Then, as shown in FIG. 11, the case 11 may be rotated in 90° to position the fastener 12 aligned to the direction of the short axis of the fit-in hole 32' (in case that the fit-in hole 32' has a long axis and a short axis). After that, due to tighten a screw, the volume piece 12b of the fastener 12 can be pressed onto the second disperser member 32 which is inner bonnet, while the sound transfer face 11a can be pressed onto the first disperser member 31 which is outer bonnet. As a result, the case 11 (and the sound generator in it) can be fastened onto the bonnet.

Figure 13:
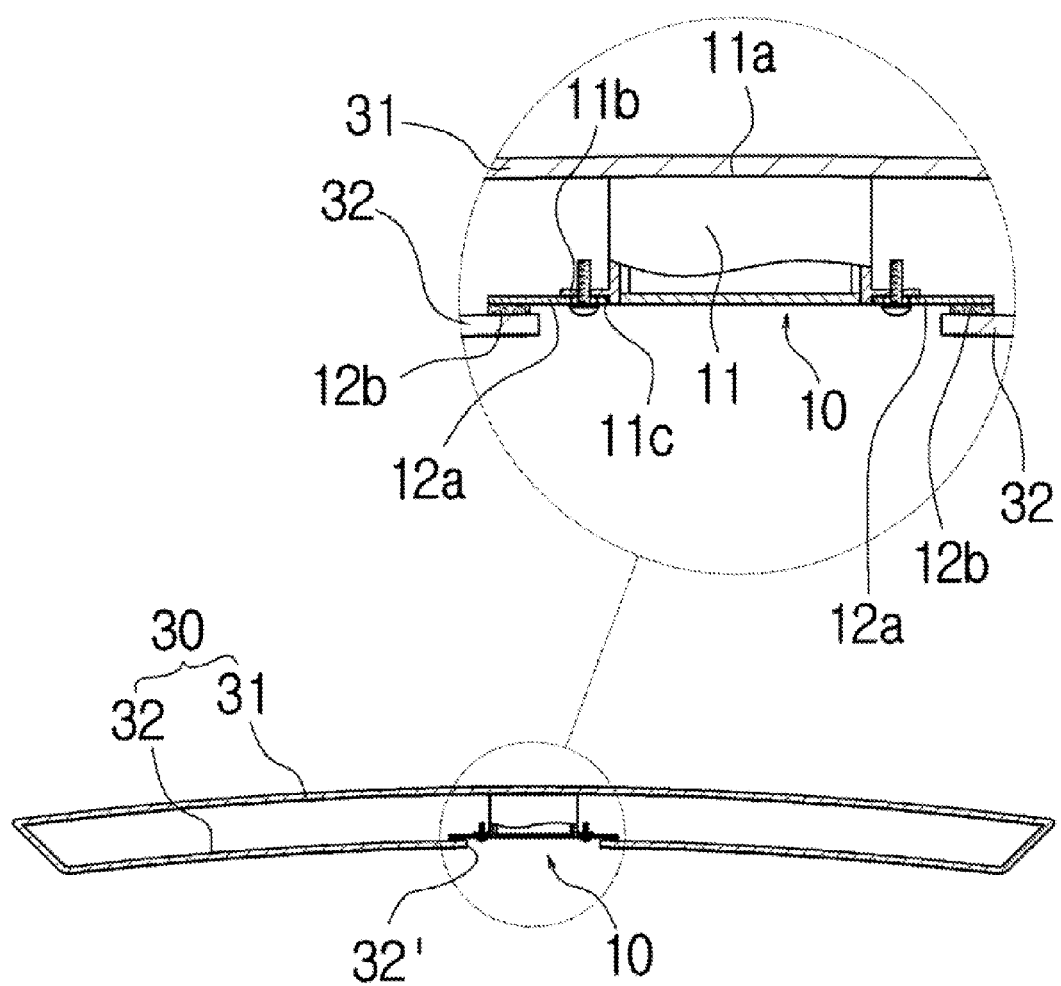
FIG. 13 is a perspective view showing an equipped state of another embodiment according to the present invention.

Details of the resulting states are shown in FIGS. 12 and 13.

In other words, the case 11 may be inserted into the fit-in hole 32' of the second disperser member 32 at inner side of the bonnet due to the diameter of the case 11 is slightly smaller than the diameter of the fit-in hole 32'. Considering the interference the fastener 12 protruded from the both sides of the case 11 and the fit-in hole 32', the case 11 may be inserted such that the fastener 12 is aligned to the direction of the long axis of the fit-in hole 32 (that is, in case the fit-in hole 32 is a long hole).

In here, the sound transfer face 11a of the case 11 may be facing a face to the first disperser member 31 that is the outer layer of the bonnet, while the volume piece 12b of the fastener 12 may be facing to a face of the second disperser member 32 that is the inner layer of the bonnet positioned at the direction of the engine room of the bonnet. The face faced by the sound transfer face 11a and the face faced by the volume piece 12b are facing each other.

Then, as shown in FIGS, the fastener 12 is positioned in a state that is tilted against the fastening groove 11c of the case 11. In this state, the case 11 may be rotated in 90° to position the fastener 12 aligned to the direction of the snort axis of the fit-in hole 32' (in case that the fit-in hole 32' has a long axis and a short axis).

After that, as shown in FIG. 13, due to tighten a screw, the end of the fastener 12 that the volume piece is positioned may be descended, pivoted the position of the screw tightening, to press the second disperser member 32. As a result of this, the sound transfer face 11a positioned opposite from the volume piece 12b can be pressed and fastened onto the first disperser member 31 which is outer bonnet.

Figure 14:
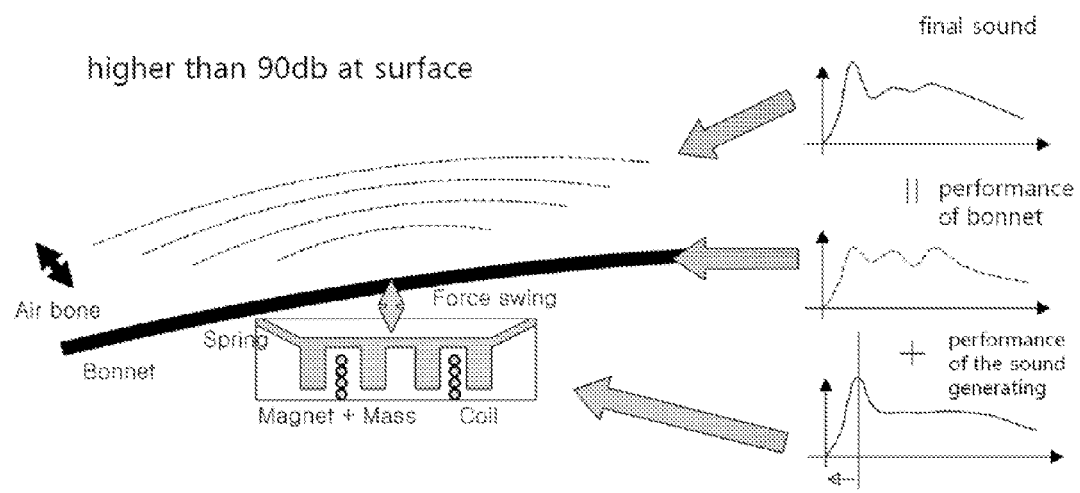
FIG. 14 is a schematic view showing sound transfer states and sound properties of components of an embodiment according to the present, invention.

Referring to FIG. 14, the sound transfer states is shown when the present invention applied to the bonnet. For example, when the generator 20 is fastened onto the large plate such as the vehicle bonnet, quality of the generated sound would be determined by sum of performances of the vibrating speaker and the plate equipped with the generator.

Then, comparing to a directional speaker, the sound radiation angle can be widen, and it has the advantages that influences due to environmental elements such as snow, rain, dust etc. may be avoided.

An experiment according to the invention shows —20 db around 100 Hz.

And, according to the invention, the sound generating device can be equipped without deforming the first disperser member 31 that is the outer bonnet member, since the pressure force of the fastener 12 pushes and fastens the sound transfer face 11a of the case 11 onto the first disperser member 31.

And, the sound transfer face 11a of the sound generating device is pressed and fastened to the first disperser member 31 among the disperser 30, while the fastener 12 is pressed and fastened to the second disperser member 32 among the disperser 30. As a result, the output of the sound generating device transfers both directions and disperses. This can improve sound transfer ratio from the sound generating device to the bonnet that is the disperser 30, without attenuation of output of the sound generating device.

Hereinafter, another embodiment of the present invention will be described.

Figure 15:
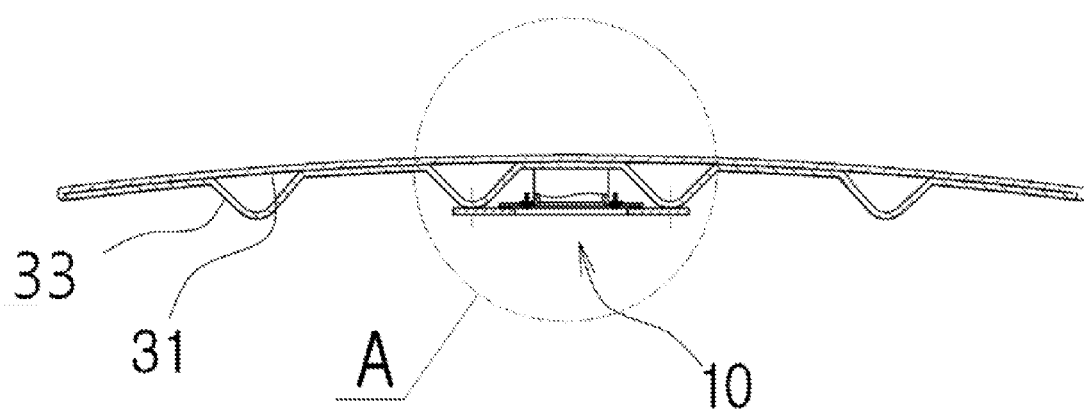
FIG. 15 is a sectional view showing an equipped state of another embodiment according ho the present invention.
Figure 16:
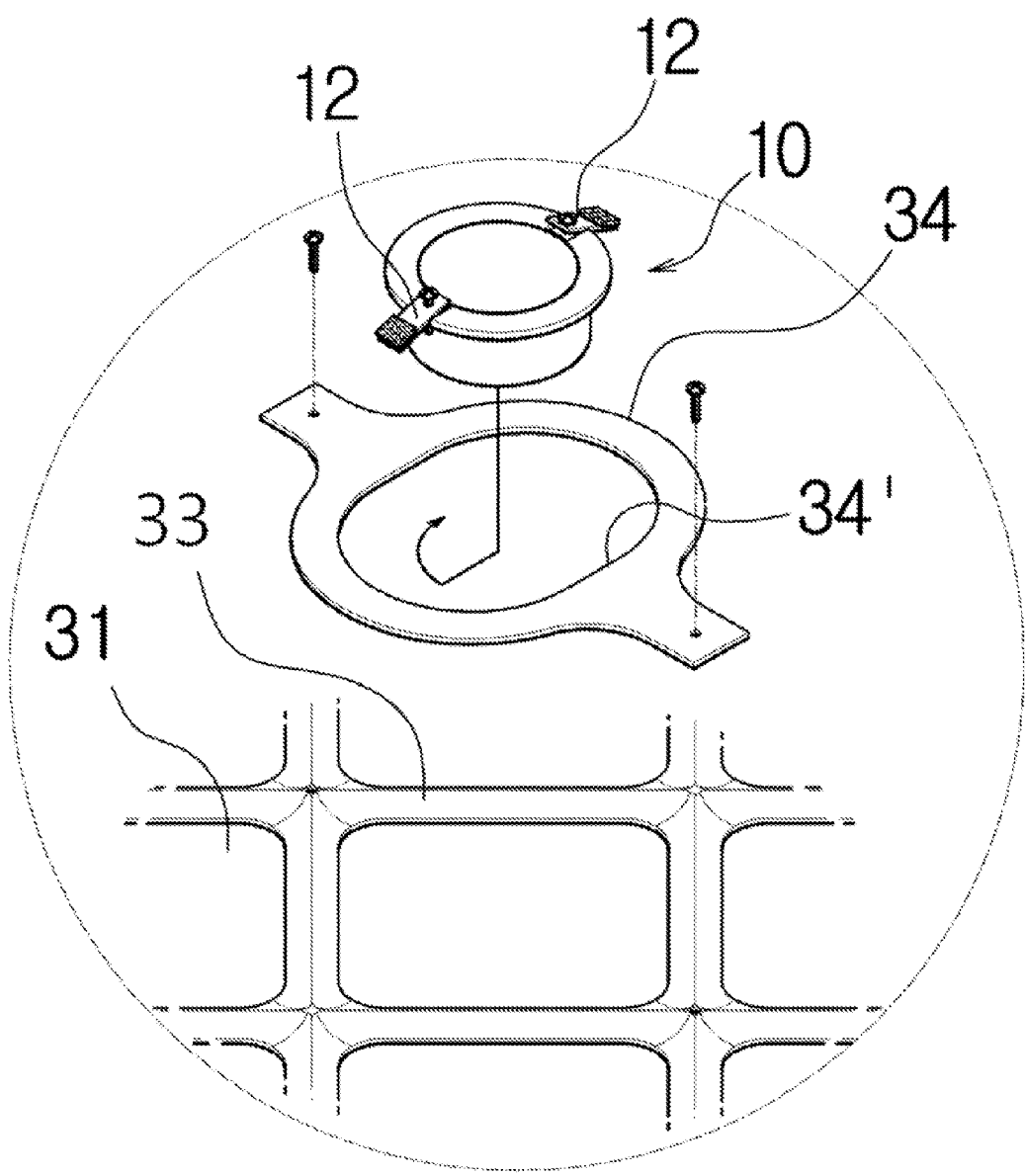
FIG. 16 is a exploded perspective view showing structure of A in FIG. 15.
Figure 17:
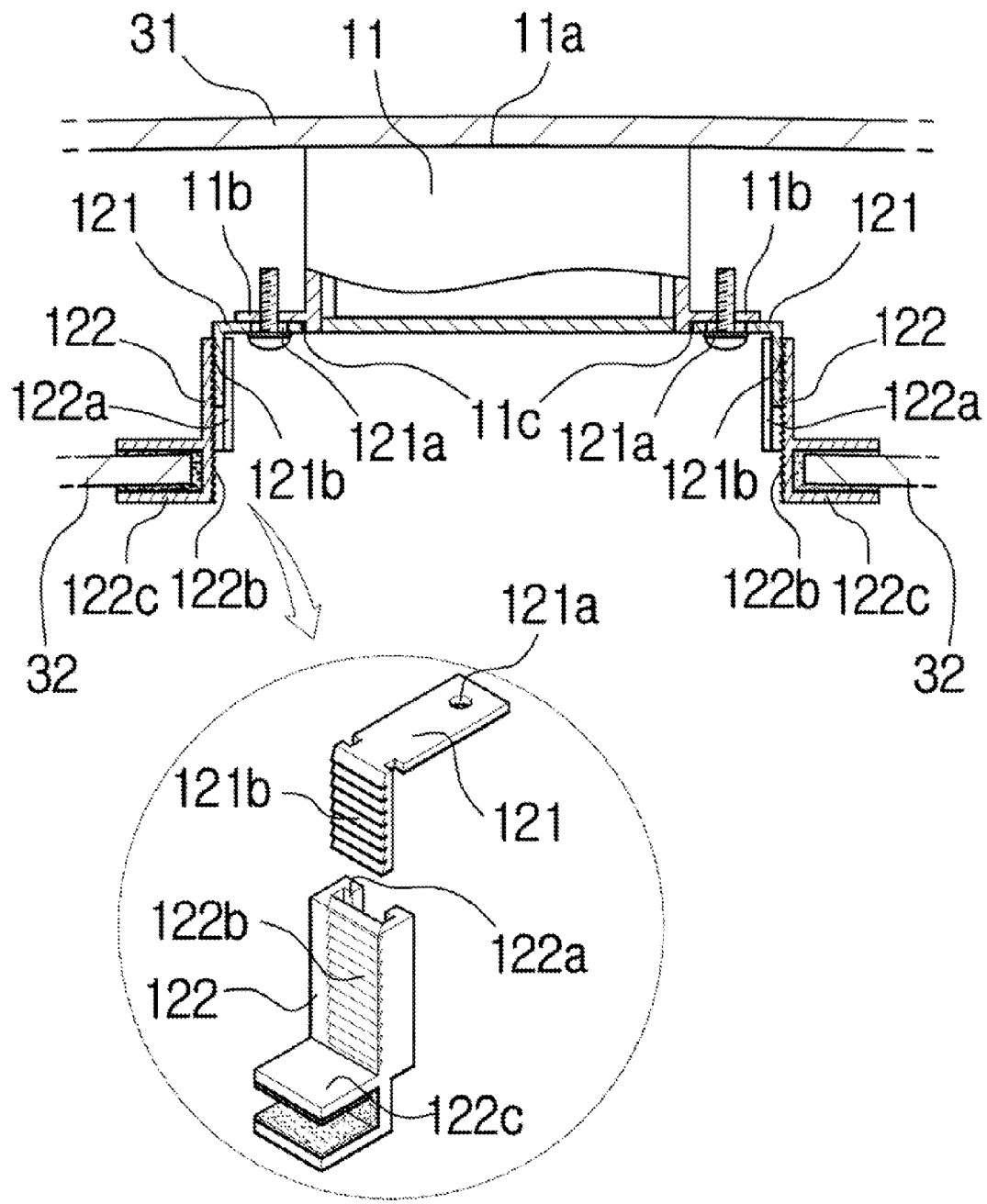
FIG. 17 is a sectional view showing a composition and structure of another embodiment according to the present invention.

First, as shown in FIG. 15 and 16, in the present embodiment of the present invention, the disperser 30 comprises a double layered structure of a main pane formed by a first disperser member 31 and a support frame 33 which is welded to and embossed from the main panel.

When the disperser 30 is a double layered structure formed by a main panel of first disperser member 31 and a support frame 33 welded to and embossed on the main panel of first disperser member 31, an auxiliary fastener 34 is provided onto at least two protruded points among embosses of the support frame 33, The auxiliary fastener 34 has a fit-in hole 34'. In this case, the case 11 may be inserted through the fit-in hole 34' formed at the auxiliary fastener 34. After that, due to screw tightening, the volume piece 12b of the fastener 12 can be pressed onto the auxiliary fastener 34, while the sound transfer face 11a can be pressed and fastened onto the first disperser member 31 that is the main panel.

The present embodiment according to the invention has the same operative effects as the above-mentioned embodiments according to the invention.

Meanwhile, in the present embodiment, the fastener 12 may be comprise: a first fastening pieces 121 folded into a shape like " ", wherein a note 121a for screw combining to the case 11 is formed at its horizontal face, and a tooth 121b upwardly sloped is formed along the vertical direction at its vertical face; and a second fastening pieces 122 folded into a shape like " ", wherein a guide 122a shaped like " " for preventing the first fastening pieces 121 is formed at its vertical end, tooth 122b corresponding the tooth 121b of the first fastening pieces 121 at its vertical face, and a fastening member 122c is formed at its horizontal end, the fastening member 122c is fastened by being inserted into circumference of a fit-in hole 32' formed at the second disperser member 32.

In this case, when the first fastening piece 121 is pressed into the direction of the first disperser member 31 which is positioned opposite against the direction of the second disperser member 32, since the tooth 121b and 122b would act as a clutch so as to maintain a pressed state and not to move back, the sound transfer face 11a of the case 11 could be pressed and fastened onto the first disperser member 31.

Also, the first fastening piece 121 may be made with the case 11 as an integral component.

Although the exemplary embodiments for exemplifying the principle of the present invention have been described and shown, the present invention is not limited to the configurations and operation.

In addition, it will be appreciated by those skilled in the art that the present invention can be variously modified and changed without departing from the spirit of the present invention claimed in the claims, Therefore, all modifications, changes, and equivalents thereof will be regarded as pertaining to the scope of the present invention.

DESCRIPTION OF REFERENCE NUMERALS

10: generator housing
11: case
11a: sound transfer face
11b: flange
11c: fastening groove
11d: screw hole
12: fastener
12a: fastening pieces
12b: volume piece
12c: hole
121: first fastening pieces
121a: hole
121b: tooth face
122: second fastening pieces
122a: guide
122b: tooth face
122c: fastening member
20: sound generator
30: disperser
31: first disperser member
32: second disperser member
32': fit-in hole
33: support frame
34: auxiliary fastener
34': fit-in hole

The invention claimed is:

1. A sound generating device for vehicle, the sound generating device comprising:
a sound generator 20 vibrating to output sound signal corresponding to a sound source, which has a coil applied electric alternating signals that interacts with a magnetic circuit including a magnet;
a disperser 30 in the vehicle, which comprises a double layered plate formed by a first disperser member 31 and a second disperser member 32, or comprises a one layered plate formed by a first disperser member 31 and a support frame 33; and
a generator housing 10 to hold the sound generator 20 between the first disperser member 31 and the second disperser member 32 or the support frame 33, and to transfer the sound generated by the generator 20 to the disperser 30,
wherein the generator housing 10 comprises:
a case 11 having a first outer circumference and a second outer circumference. to hold the sound generator 20, and to provide a sound transfer face 11a against the first disperser member 31; and
a fastener or fasteners 12 protruded from a side of two sides of the case 11, which provides pressure onto the second disperser member 32 or the support frame 33 by screw tightening so that the sound transfer face 11 a can be pressed to the first disperser member 31.
wherein the case 11 comprises:
a flange or flanges 11b at the first outer circumference or at the first and second outer circumferences of the case 11,
wherein the flange 11b at the first outer circumference provides fastening area for the fastener 12; and
wherein the flange 11b at the second outer circumference provides expansion of the sound transfer face.

2. The device of claim 1, wherein the case 11 comprises:
a flange or flanges 11b at the first outer circumference or the first and second outer circumferences of the case 11, wherein one end of the fastener 12 is put into an outer face of the flange 11b so as to have some height with and not protruded out from the outer face of the flange 11b;
fastening grooves 11c to prevent the fastener or fasteners 12 moving laterally; and
screw holes 11d in the fastening grooves 11c to screw tighten the fastener 12.

3. The device of claim 1, wherein the fastener 12 comprises:
fastening pieces 12a having a first end and a second end;
volume piece 12b provided at the first end of the fastening pieces 12a corresponding to the second disperser member 32, which provides pressing or sticking force against the second disperser member 32; and
hole 12c formed at the second end of the fastening pieces 12a so that a screw can be combined into a screw hole lid formed at a face of the case 11.

4. The device of claim 3, wherein the fastening piece 12a is a rectangular plate having a long axis and a short axis.

5. The device of claim 1, wherein the sound generator 20, which vibrates to output sound signal corresponding to a sound source, which has a coil applied electric alternating signals that interacts with a magnetic circuit including a magnet,comprises:
a support frame to support the magnetic circuit in the case 11.

6. The device of claim 5, wherein the sound generator's vibration is:
vibrations of a vibrating plate fastened at an end of the coil;
vibrations of the magnetic circuit; or
simultaneous vibrations of both of the vibrating plate and the magnetic circuit.

7. The device of claim 5, the sound generator's vibration is:
vibrations moving back and forth in a direction of the coil; or
vibrations moving back and forth in a lateral direction with the center at the coil.

8. The device of claim 1, wherein the disperser 30 is a vehicle bonnet, which comprises a double layered structure having inner space formed by a first disperser member 31 and a second disperser member 32.

9. The device of claim 8, wherein the second disperser member 32 comprises:
a fit-in hole 32' which is a circle hole having a diameter larger than that of the case 11, or a long hole having a long axis and a short axis.

10. The device of claim 1, wherein the disperser 30 is a vehicle bonnet, which comprises a double layered structure formed by a plate of first disperser member 31 and a support frame 33 welded to and protruded on the plate.

11. The device of claim 1, wherein the fastener 12 comprises:
a first fastening pieces 121 having a horizontal face and a vertical face, wherein a hole 121a for screw combining to the case 11 is formed at its horizontal face, and a tooth 121*b* upwardly sloped is formed along the vertical direction at its vertical face; and a second fastening pieces 122 having a vertical face. a vertical end and a horizontal end, wherein a guide 122*a* for preventing the first fastening pieces 121 is formed at its vertical end, a tooth 122*b* corresponding the tooth 121*b* of the first fastening pieces 121 at its vertical face, and a fastening member 122*c* is formed at its horizontal end, the fastening member 122*c* is fastened by being inserted into a circumference of a fit-in hole 32' formed at the second disperser member 32.

* * * * *

UNITED STATES PATENT AND TRADEMARK OFFICE
CERTIFICATE OF CORRECTION

PATENT NO. : 9,616,813 B2
APPLICATION NO. : 14/778541
DATED : April 11, 2017
INVENTOR(S) : Yoon Kyu Kang Page 1 of 1

It is certified that error appears in the above-identified patent and that said Letters Patent is hereby corrected as shown below:

On the Title Page

Change the PCT Filed section as follows:
(22)     May 14, 2013

Signed and Sealed this
Seventh Day of August, 2018

Andrei Iancu
*Director of the United States Patent and Trademark Office*